US012680568B2

(12) United States Patent
Kovacs et al.

(10) Patent No.: US 12,680,568 B2
(45) Date of Patent: *Jul. 14, 2026

(54) RAIL MOUNTING APPARATUS, SYSTEM AND METHOD OF SECURING DEVICES TO A STRUCTURE

(71) Applicant: PMC Industries, Inc., Plainville, CT (US)

(72) Inventors: Tamas Kovacs, Burlington, CT (US); Robert Mercier, Newington, CT (US)

(73) Assignee: PMC Industries, Inc., Plainville, CT (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/545,021

(22) Filed: Dec. 19, 2023

(65) Prior Publication Data

US 2024/0117835 A1     Apr. 11, 2024

Related U.S. Application Data

(63) Continuation-in-part of application No. 18/051,699, filed on Nov. 1, 2022, now Pat. No. 11,867,219,
(Continued)

(51) Int. Cl.
    F16B 37/04     (2006.01)
    F16B 7/04     (2006.01)
    (Continued)

(52) U.S. Cl.
    CPC .......... F16B 37/046 (2013.01); F16B 7/0473 (2013.01); F16C 29/123 (2013.01);
    (Continued)

(58) Field of Classification Search
    CPC .... F16B 7/0473; F16B 37/046; F16C 29/123; F24S 25/30; F24S 25/61; F24S 25/632;
    (Continued)

(56) References Cited

U.S. PATENT DOCUMENTS 3,483,910 A * 12/1969 Van Huffel ........... F16B 37/046
                                                                    411/84
8,640,401 B2     2/2014 Hong et al.
                         (Continued)

FOREIGN PATENT DOCUMENTS

CN          201936895 U  *  8/2011  ........... F24S 25/636
CN          202585459 U  *  12/2012  ........... F24S 25/636
                         (Continued)

*Primary Examiner* — Jessie T Fonseca
(74) *Attorney, Agent, or Firm* — Wasserbauer Law, LLC; Damian G. Wasserbauer, Esq.; Nicholas E. Blanton, Esq.

(57) ABSTRACT

A retention apparatus, system and method is useful for attaching items, panels or other devices to a rail formed in longitudinal lengths and configured with a cross-sectional profile having multiple cooperating structures between the rail and a channel nut. Self-aligning, mating structures include a recess formed between a tooth and shelf on an interior first channel portion of the rail and a flange of the channel nut with concurrent mating of an anchor latch of the rail and a hook flange on the channel nut. Latching of the channel nut is accomplished initially by compression of the biasing element as the channel nut is inserted and then, upon release, biasing element-induced movement of the channel nut into a latching position. Grounding spikes on the biasing element form electrical contact points between the rail, the clamp and the frame of the solar panel or other device.

2 Claims, 19 Drawing Sheets

Related U.S. Application Data which is a continuation of application No. 17/060, 073, filed on Sep. 30, 2020, now Pat. No. 11,486,434.

(51) Int. Cl.

| | |
|---|---|
| *F16C 29/12* | (2006.01) |
| *F24S 25/30* | (2018.01) |
| *F24S 25/61* | (2018.01) |
| *F24S 25/632* | (2018.01) |
| *F24S 25/636* | (2018.01) |
| *H02S 20/20* | (2014.01) |
| *H02S 20/23* | (2014.01) |
| *F24S 25/60* | (2018.01) |

(52) U.S. Cl.
CPC ............... *F24S 25/30* (2018.05); *F24S 25/61* (2018.05); *F24S 25/632* (2018.05); *F24S 25/636* (2018.05); *H02S 20/20* (2014.12); *H02S 20/23* (2014.12); *F24S 2025/6003* (2018.05); *F24S 2025/6005* (2018.05); *Y02E 10/50* (2013.01)

(58) Field of Classification Search
CPC ............. F24S 25/636; F24S 2025/6003; F24S 2025/6005; H02S 20/20; H02S 20/23
See application file for complete search history.

(56) References Cited

U.S. PATENT DOCUMENTS

| | | | | |
|---|---|---|---|---|
| 9,850,661 | B2 | | 12/2017 | Kovacs |
| 10,205,418 | B2 * | | 2/2019 | Nayar ..................... F24S 25/60 |
| 10,218,305 | B1 * | | 2/2019 | Schrock ................. H02S 20/20 |
| 10,469,022 | B2 | | 11/2019 | Kovacs |
| 10,951,157 | B1 * | | 3/2021 | Young ..................... H02S 30/10 |
| 11,041,314 | B2 | | 6/2021 | Kovacs |
| 2011/0126881 | A1 * | | 6/2011 | Hong .................... F24S 25/636 |
| | | | | 136/244 |
| 2018/0135891 | A1 * | | 5/2018 | Li .......................... F24S 25/636 |
| 2019/0068110 | A1 * | | 2/2019 | McPheeters ........... F24S 25/70 |
| 2019/0273460 | A1 * | | 9/2019 | Kovacs ................... F24S 25/35 |
| 2020/0313604 | A1 * | | 10/2020 | Harris .................... F16B 2/065 |

FOREIGN PATENT DOCUMENTS

| | | | | | | |
|---|---|---|---|---|---|---|
| CN | 204376810 | U | * | 6/2015 | ........... | F24S 25/636 |
| CN | 104980094 | A | * | 10/2015 | ........... | F24S 25/636 |
| CN | 108708505 | A | * | 10/2018 | ......... | E04D 13/1687 |
| DE | 202010013976 | U1 | * | 12/2010 | ............. | F24S 25/33 |
| DE | 202012004615 | U1 | * | 7/2012 | ........... | F24S 25/613 |
| WO | WO-2009137887 | A1 | * | 11/2009 | ........... | H02S 20/23 |

* cited by examiner

404

126
180
160
139
125
168
160
180
127
122
120
133
172
124

RAIL MOUNTING APPARATUS, SYSTEM AND METHOD OF SECURING DEVICES TO A STRUCTURE

CROSS-REFERENCE TO RELATED APPLICATIONS

This application is a continuation-in-part of, and claims the benefit of, U.S. patent application Ser. No. 18/051,699, now U.S. Pat. No. 11,867,219, entitled "Rail Mounting Apparatus, System And Method Of Securing Devices To A Structure," filed on Nov. 1, 2022, which in turn is a continuation of Ser. No. 17/060,073, now U.S. Pat. No. 11,486, 434, entitled "Rail Mounting Apparatus, System And Method Of Securing Devices To A Structure," filed on Sep. 30, 2020, which in turn claims priority to and the benefit of U.S. Provisional Patent Application No. 62/874,953, filed on Jul. 17, 2019, entitled "Rail Apparatus, System And Method Using Channel Nut", which are incorporated by reference herein in their entirety.

TECHNICAL FIELD

The present invention relates to retention systems for securing panels or other devices to a structure, and more particularly to a rail having an attachment system capable of engaging the rail by pushing into one or more openings of the rail, maintaining position in the rail, and securing the respective rail and channel nut to the structure and electrical ground.

BACKGROUND

Solar panels are typically mounted over a surface of the structure such as residential or commercial building rooftops, or to the earth as in solar arrays, using solar panel mounting systems that are secured to the structure, for example, by rafters, support beams, anchoring posts, pads, and the like, in a portrait or landscape orientation. These mounting systems commonly include a series of rails spanning the rooftop that are secured to the structure using a variety of fastener and mounting system designs. Typically, each photovoltaic (PV) module rests on an upper edge of a plurality of rails so that a fastener assembly may secure the frame of the PV to the structure to maintain a gap between panels and/or an inclined angle from the structure or earth. The PV modules further require electrical grounding to the rail system which may be accomplished through the fastener system.

Typical rails use attachment systems having a fastener and/or nut to engage the rail in one of several ways such as, for example, placing the nut into a rail opening directly, by rotating the fastener and nut to allow insertion into a channel, followed by rotation of the fastener. The disadvantage of this attachment system is that it requires simultaneous vertical and rotational motion for channel nut placement. In other attachment systems, the profile of the nut is shaped to slide into an open end of a rail channel and then translated to the desired position along the rail. The disadvantage here is that aligning the channel nut profile to the channel, inserting it, and then sliding into position takes additional time, which is compounded by the number of nuts that must be inserted. Furthermore, removing a nut requires access to an open end of the channel. As a result, inserting too may or too few fastener/nut assemblies are errors that take a long time to fix. Any of the above disadvantages may therefore add time to the installation process, while adding too many fasteners and not removing them may increase materials usage. Therefore, there is a need for a rail mounting system for securing PV panels and other devices having a fastener assembly with a channel nut that can be inserted quickly and directly into the channel of the rail and retained in a desired position so as to allow for simplified placement or removal of the fasteners on the rail to assist the installers when operating on the structure.

SUMMARY

It is an object of the present invention to provide a retention apparatus, system and method of attaching items, panels or other devices using a channel nut having a biasing element to operably connect to interior structures of a mounting rail.

It is an object of the present invention to form a rail in longitudinal lengths configured with a cross-sectional profile having multiple cooperating interior structures between the rail and a channel nut including a recess formed between a tooth and shelf on an interior first channel portion of the rail and a flange of the channel nut, between an anchor latch of the rail and hook flange on the channel nut.

It is an object of the present invention to provide a biasing element that securely couples to the channel nut, to provide cooperating forces and movement of the channel nut into a latching position. Such a biasing element is generally purposed for aiding the worker during the installation process to keep the channel nut in place while the device, e.g., solar panel, is being installed on the structure, such as a roof. A biasing element of this sort provides for a safer installation process, for example, by freeing up a hand of the worker, that would otherwise be needed to hold the channel nut in place, while simultaneously moving the typically heavy device in place for secured attachment to the structure. Because roofs and other structures are typically dangerous environments to work in, it is a primary aim of this disclosure to facilitate the safety of the worker and make the installation process easier. Such a biasing element may also reduce the amount of time needed for the worker to be on the roof.

It is an object of the present invention to provide a retention apparatus, system and method of attaching items, panels or other devices using a channel nut and a rail advantageously of a simplified construction and assembly that satisfies a long felt need for installing panels and devices to a structure.

DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION

Figure 1:
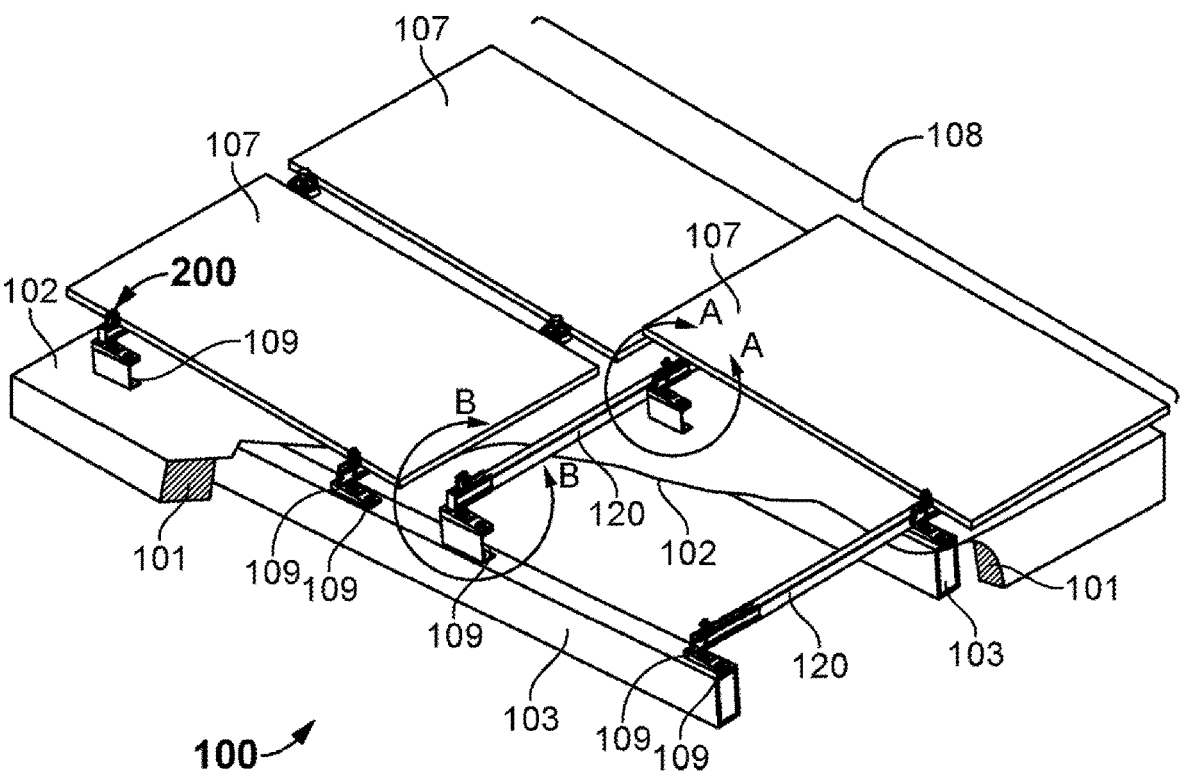
FIG. 1 illustrates a perspective view of the rail and channel nut apparatus, system and method in portrait position according to an embodiment of the invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention. For a better understanding of the present invention, reference will be made to the following Detailed Description, which is to be read in association with the accompanying drawings, which are incorporated in and constitute a part of this specification, show certain aspects of the subject matter disclosed herein and, together with the description, help explain some of the principles associated with the disclosed implementations.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

Additionally, the term "structure" refers to the earth, or a structure to secure the rail 120 thereto, or both; for example, the structure can be a pad, post, anchor, bracket, or other support. It is to be appreciated that the features of rail 120 can be formed integral or within any structure as needed to fasten the channel nut thereto. It will be appreciated that the type of support need not be limited to a structure that is a part of a solar panel racking system or solar panel support system.

Referring to FIGS. 1-21, a retention apparatus, system and method of attaching items, panels or other devices to a structure, is generally identified as element 100 herein. The retention system 100 is described in an environment of securing a solar panel or photo-voltaic (PV) module 107 to a structure such as a building, house, roof, structures disposed in the earth, and the like in solar arrays. It will be appreciated that the features of the retention system 100 allows the quick and efficient installation of solar panel racking systems. It is to be understood that what has been described are exemplary embodiments of the invention. One of skill in the art will appreciate that the channel nut may be secured at any desired location along the length of the rail, or structure incorporating the features of the rail, thereby further facilitating the application of the retention system 100 to other fields of use such as aircraft, vehicles and other industrial applications.

Figure 2:
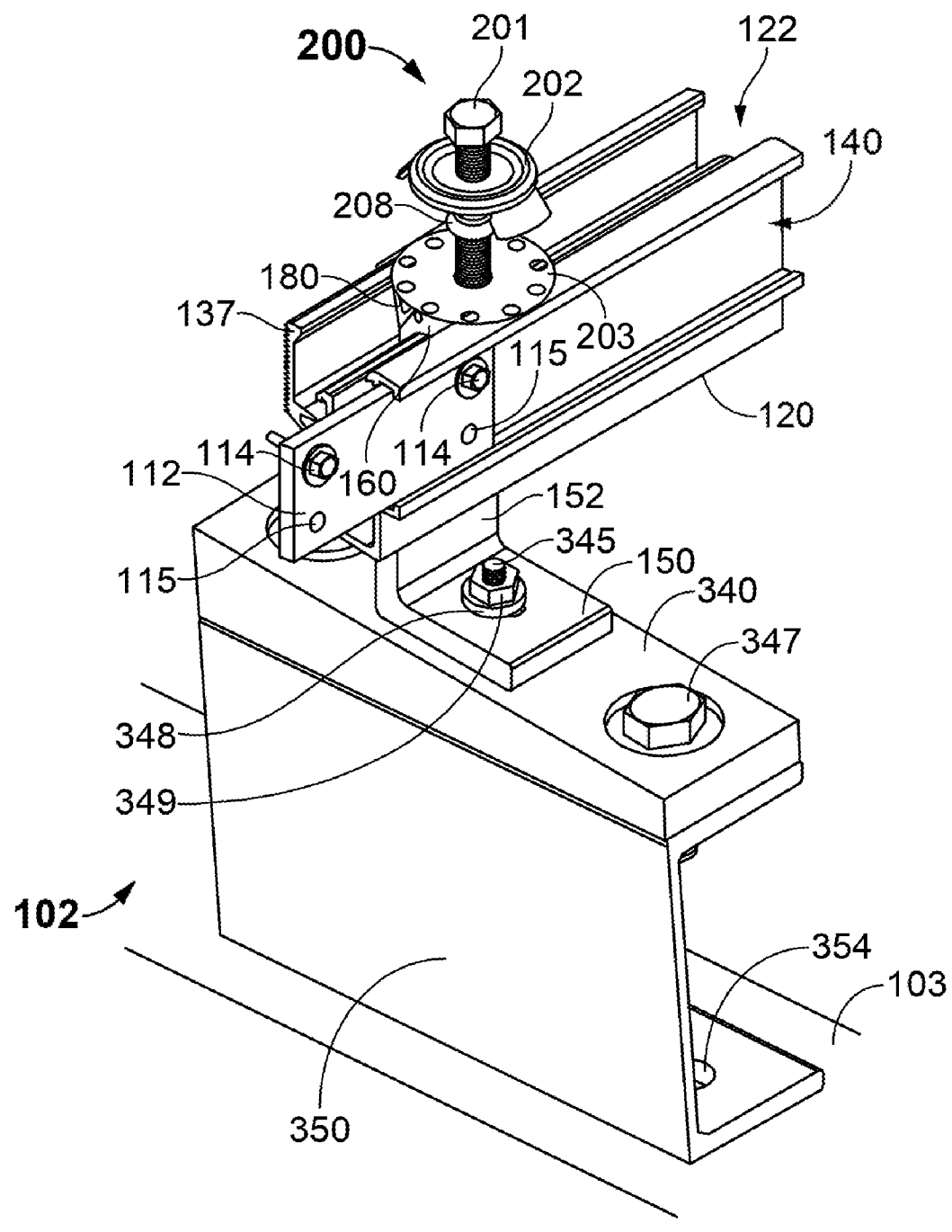
FIG. 2 illustrates an enlarged view, taken along lines A-A of FIG. 1, of the rail and channel nut apparatus, system and method according to an embodiment of the invention.
Figure 3:
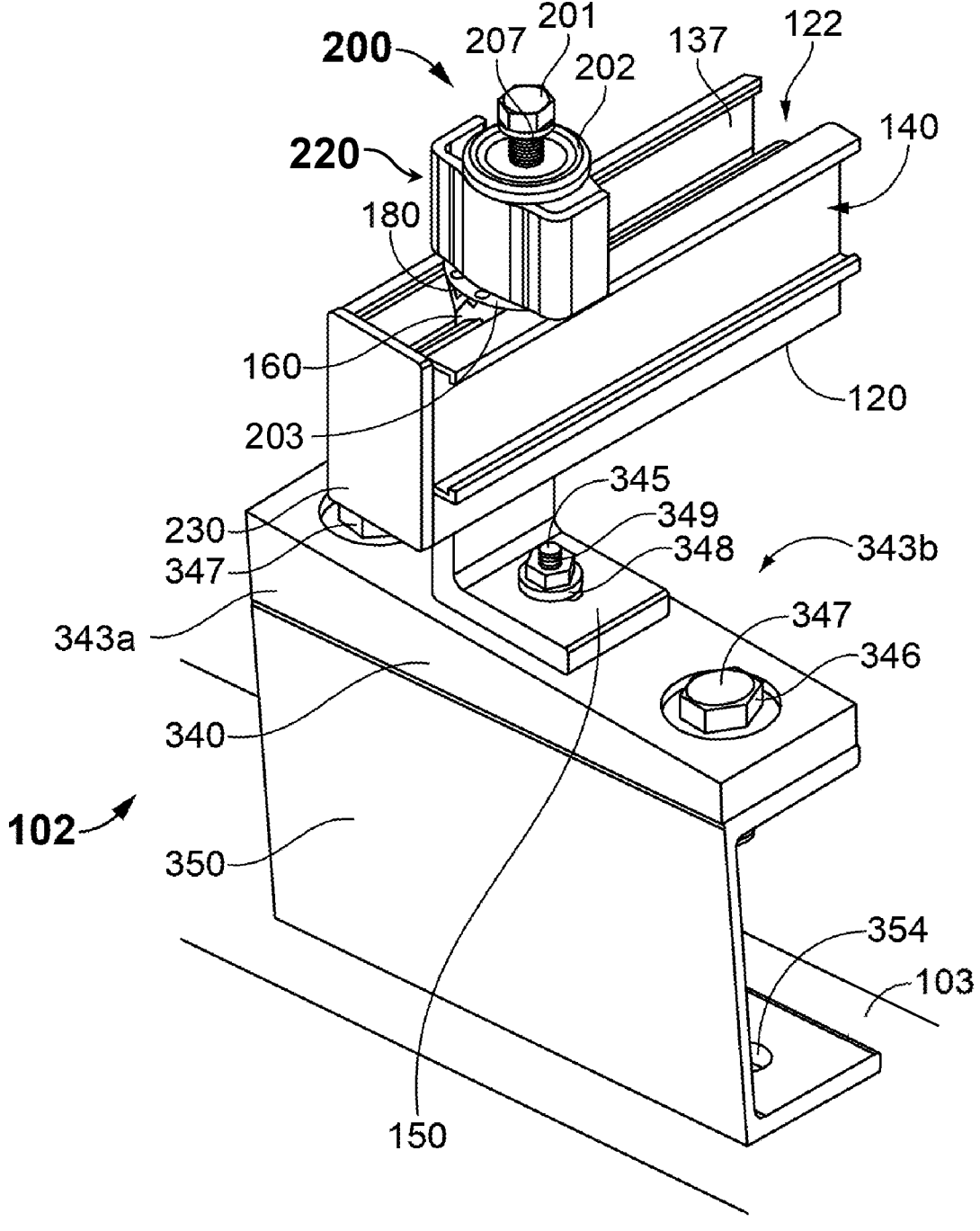
FIG. 3 illustrates an enlarged view, taken along lines B-B of FIG. 1, of the rail and channel nut apparatus, system and method according to an embodiment of the invention.
Figure 4:
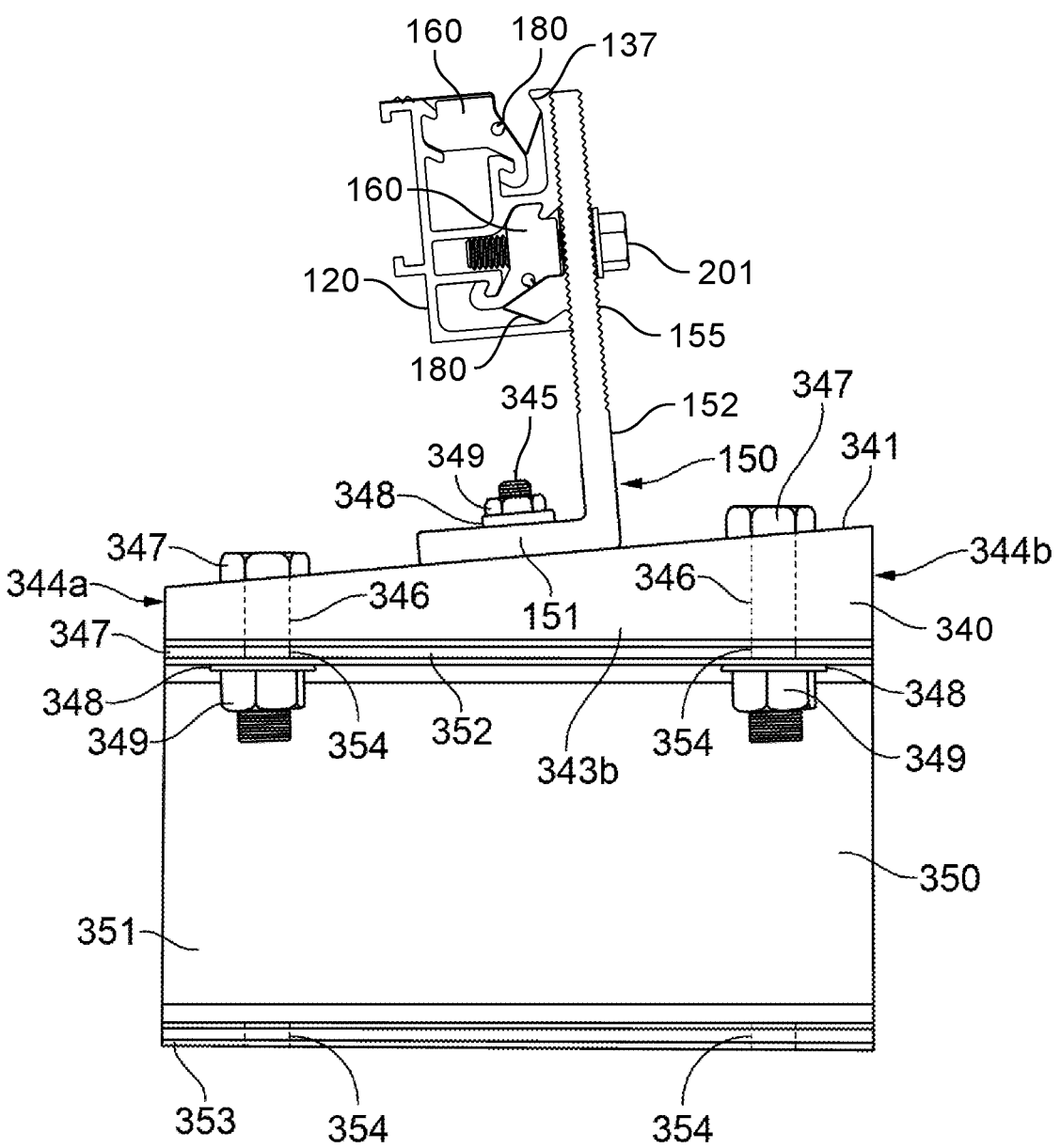
FIG. 4 illustrates a side view of the invention in a landscape position thereof.

Referring initially to FIGS. 1-10, the retention system 100 comprises a rail 120, a channel nut 160 including a biasing element 180 cooperating with interior structures of the rail 120, according to an embodiment of the invention. The rail 120 of predetermined cross-sectional design may be formed by, for example, an extrusion process, or any other fabrication method known in the art. The rail 120 operatively connects to the channel nut 160 inserted in the first opening 122 and second opening 124 in the rail 120, as shown in FIGS. 4-5, 20A-20F and 21. The channel nut 160 is dimensioned to fit within the first and second openings 122, 124 so as to engage the tooth 125 and the anchor latch 133. Orthogonal rail openings 122 and 124 have the same cross-sectional profile so as to accept the channel nut profile in either opening and provide for snap-in installation. Referring to FIG. 4, the fastener 201 and channel nut 160 may be used to couple the rail 120 through an L-bracket 150, support, 340 and stand support 350 to the structure surface 102 such as roofing materials, a beam 103 within the structure or to another element of the structure 101. The channel nut 160 is also used to secure devices, such as a solar panel, to the rail 120 using, for example, a clamp assembly 200. A connector 112, formed with a plurality of openings 115 for receiving fasteners 114 therethrough, may be used to join longitudinal sections of the rail 120 as shown in FIGS. 1-2, whereby the connector 112 may be inserted into the guide channel 140 of respective longitudinal sections of rail 120 and secured by fasteners 114, such as self-tapping screws.

According to an embodiment of the invention shown in FIGS. 1-4 and 6A-6C, the retention system 100 also comprises a support 340 having a top portion 341, a bottom portion, side portions 343a and 343b, and end portions 344a and 344b. The support may be configured with a threaded post 345 disposed on the top portion 341 and one or more openings 346 configured to receive a fastener 347 therethrough. As can be seen with further reference to FIGS. 2-4 and 16, the threaded post 345 is configured to be received in a slot 154 in the base portion 151 of the L-bracket 150 and secured by a nut 349, which configuration may include a washer 348. The support 340 is useful to operably connect to the structure 101 via fasteners secured to a beam 103 through openings 346 and to support a forward edge of the PV module 107. The top portion 341 can be configured in a desired angle of elevation for the PV module 107 to allow optimal exposure to electromagnetic energy thereof. The retention system 100 also comprises a stand support 350 useful to provide spacing above the surface 102. The stand support 350 comprises a body 351 having an upper edged portion 352 and lower edged portion 353. The upper edged portion 352 includes openings 354 for securing to aligned openings 346 of the support 340 and stand support 350 using suitable fasteners 347, washers 348, and nuts 349. The lower edged portion 353 includes openings 354 for securing to the structure 101, e.g., using suitable fasteners 109 to join to a beam 103 as shown in FIG. 1.

Figure 5:
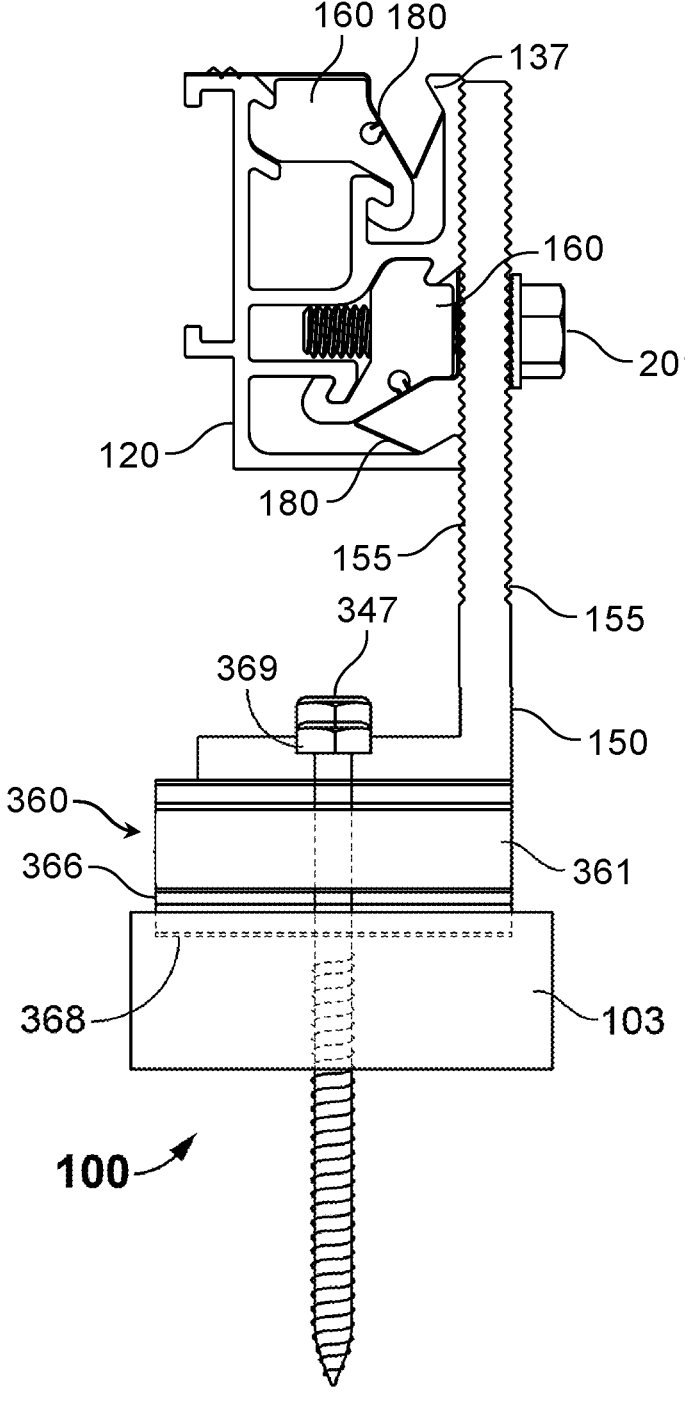
FIG. 5 illustrates a side view of another embodiment of the invention.
Figures 6A, 6B, 6C:
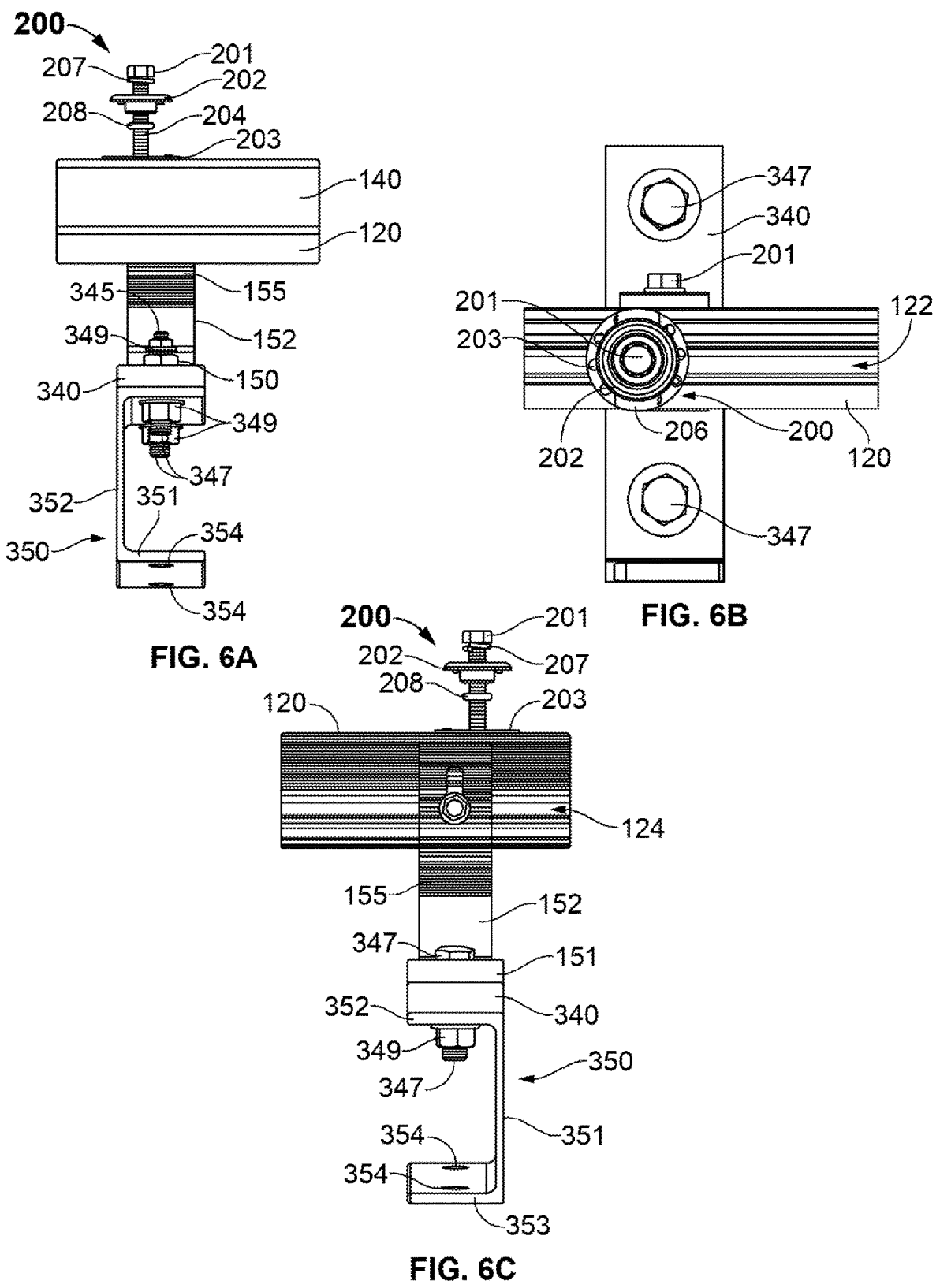
FIGS. 6A, 6B and 6C illustrate front, top, and back views, respectively, of the invention thereof.
Figure 7:
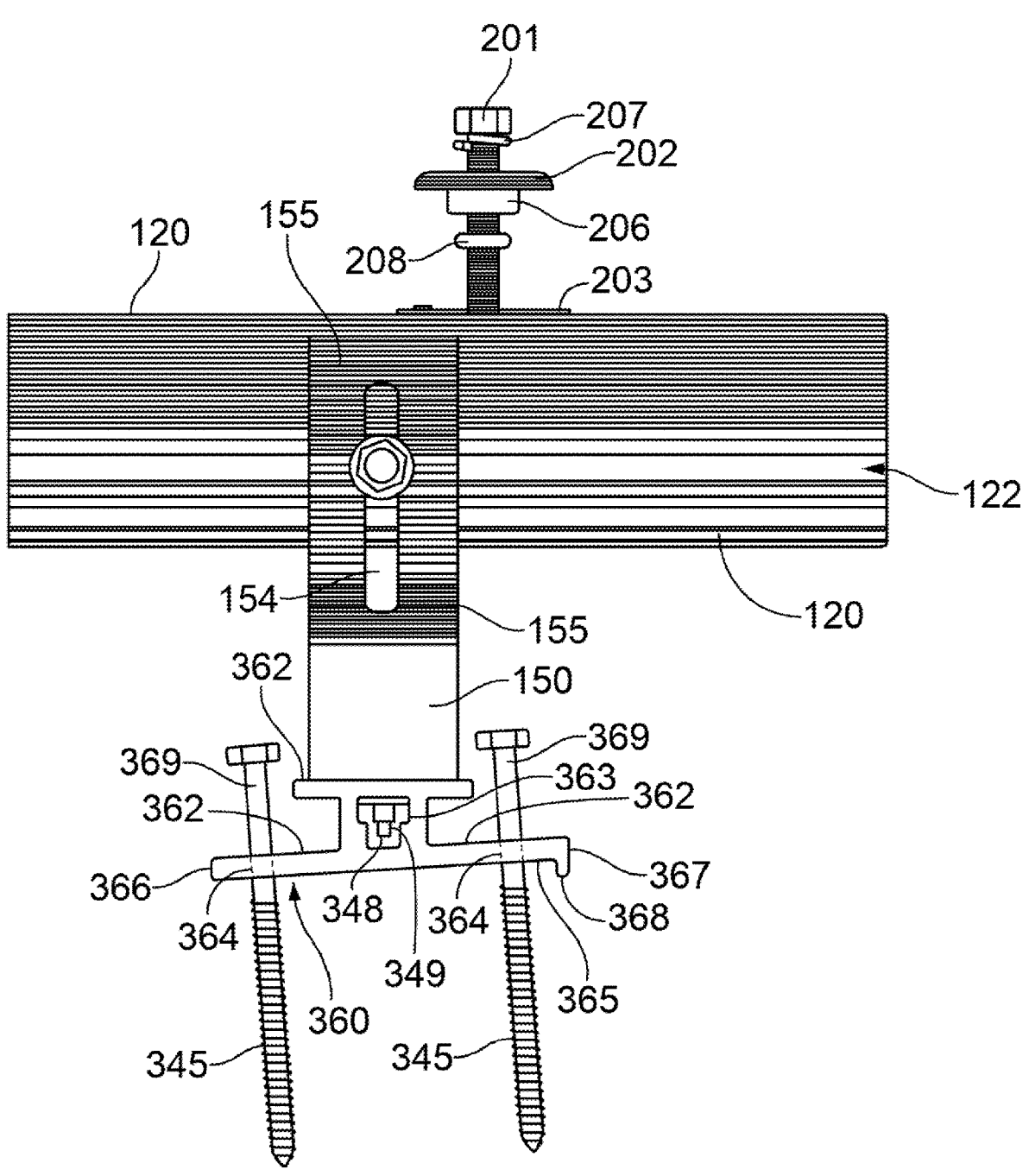
FIG. 7 illustrates a rear view of another embodiment of the invention.

According to another embodiment of the invention shown, for example, in FIGS. 5 and 7, the retention system 100 also comprises a flanged support 360 having a multi-dimensional body 361 having a top portion 362 formed with a nut cavity portion 363, a bottom portion 365, one or more openings 364 extending from the top and bottom portions 362, 365 through the body 361, and edges designated front edge 366 and rear edge 367 having a flange 368 extending from the bottom portion 365 of the body 361. The flanged support 360 is useful to engage the structure 101, for example, the flange engages a stepped structure of an island style roof via fasteners 369 engaging the beam 103 and/or directly to the structure 101.

Figure 8:
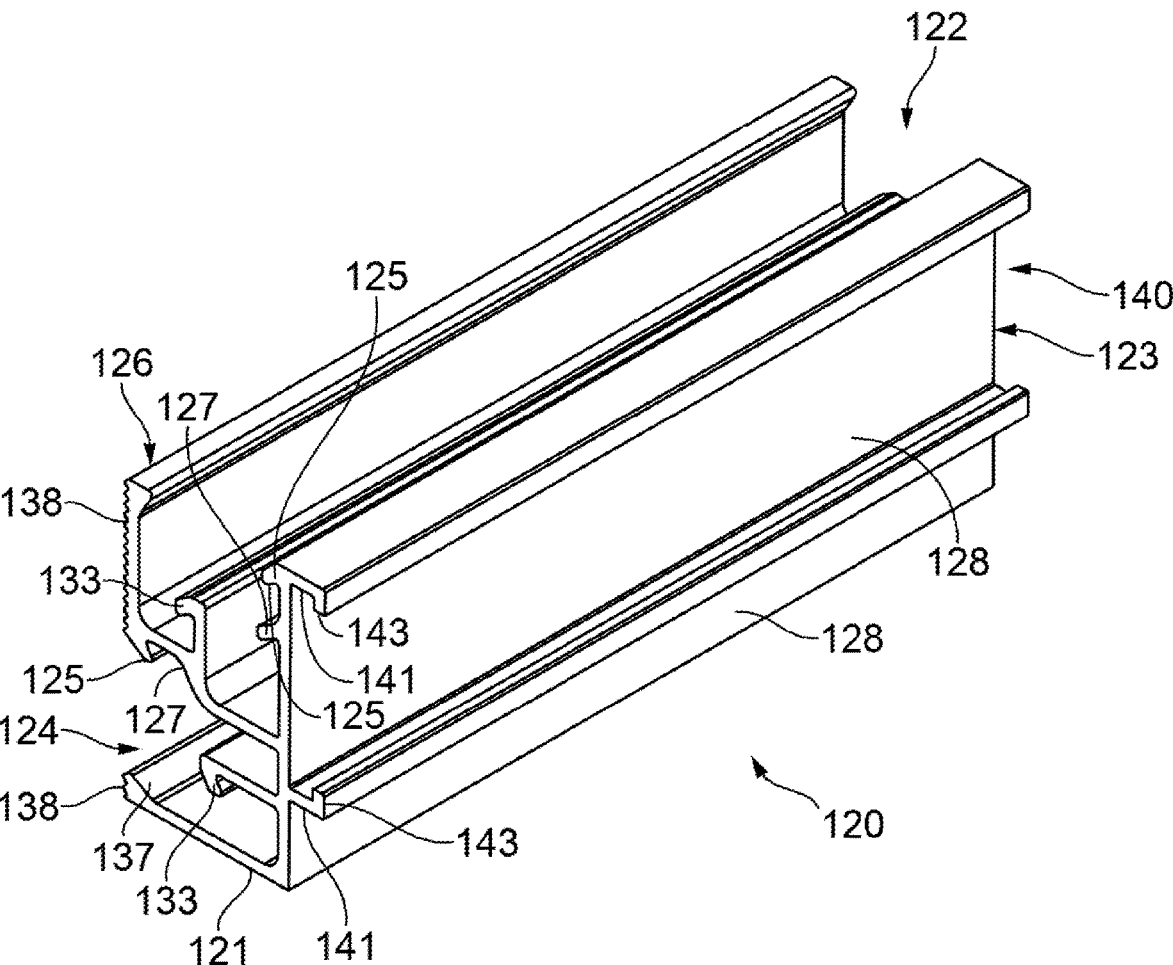
FIG. 8 illustrates a perspective view of the rail according to an embodiment of the invention.
Figure 9:
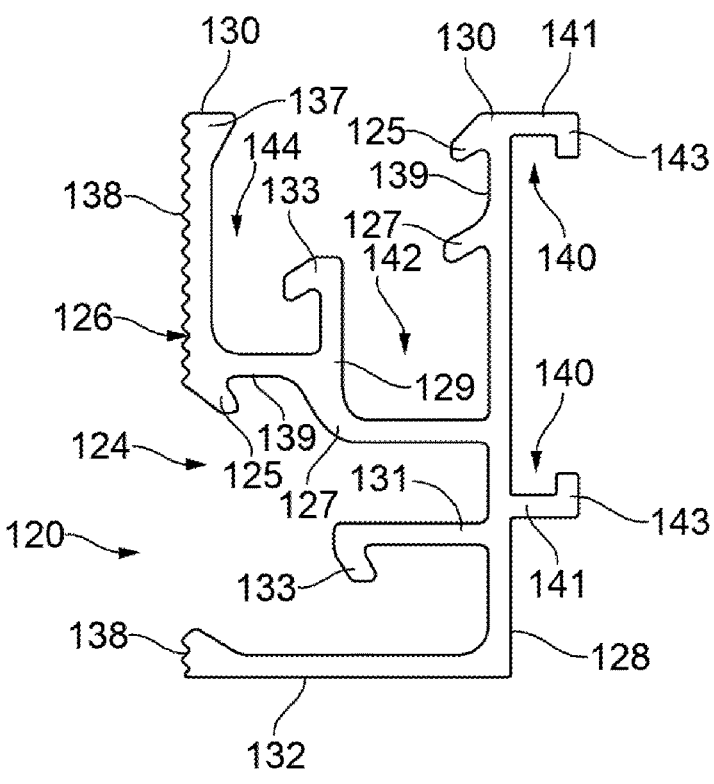
FIG. 9 illustrates a side view of the rail of the invention thereof.
Figure 10:
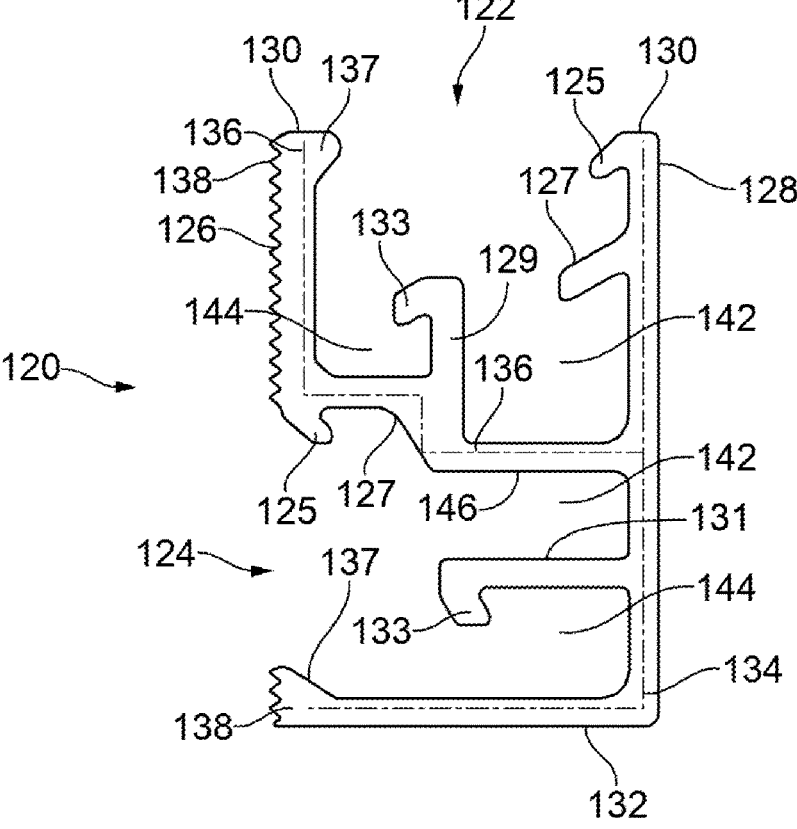
FIG. 10 illustrates a side view of the rail according to another embodiment of the invention.

As illustrated in FIGS. 8-10, the rail 120 may be formed in longitudinal lengths that have two ends 121 and 123, first and second side portions 126, 128, a top portion 130, and a bottom portion 132. The side portion 126 can also comprise rows of grooves 138 configured to interface with grooves 155 on the bracket 150 or other device. The rail 120 can be manufactured by metal and/or metal alloy extrusion techniques to provide longitudinal sections that are cut to suitable lengths. The rail 120 is formed with a device base 134 and a mount base 136 formed by a contiguous wall in the structure of the rail 120. The device base 134 comprises a contiguous wall in the structure of the rail 120 using the second side portion 128 and bottom portion 132 to form a wall of material of suitable strength and dimension such that the extruded material distributes the load from a device (PV panel, inverter, control, etc.) via the first side portion 126 to the bottom portion 132. The mount base 136 comprises a contiguous wall in the structure of the rail 120 using the first side portion 126 connected by a strut 146 to the second side portion 128. The top portion 130 is formed with the first opening 122 located on an upper side between the first and second side portions 126, 128. The first side portion 126 is formed with the second opening 124 located on a side lower section between a wall of the mount base 136 and the bottom portion 132. The rail 120 can also comprise a guide channel 140 formed on the second side portion 128 by a pair of arms 141 configured with flanges 143 at a distal end of the arms thereof.

As shown in, e.g., FIGS. 9 and 10 each of the first and second channel portions 142, 144 are segmented by support 129 and 131, respectively, each having the anchor latch 133 oriented and/or disposed in the second channel portion 144. Each the first and second openings 122, 124 are further configured with a tooth 125 having an upper sloped surface 125a, and a shelf 127. The support 129 in the first channel portion 142 is located on a wall of the mount base 136, and the support 131 in the second channel portion 144 is located on an interior wall of the device base 134. Each of the first and second supports 129, 131 have the anchor latch 133 configured to operably connect to the hook flange 172 and is used to secure channel nut 160 to mount the L-bracket 150 and/or other devices to the rail 120, or a connector 112 or clamp assembly 200 therein. Similarly, the second channel portion 144 is configured for operably connecting the anchor latch 133 to the hook flange 172 of the channel nut 160 to mount the L-bracket 150 and/or other devices to the rail 120, or a connector 112 or clamp assembly 200 therein. In the embodiment shown, the second opening 124 is arranged perpendicularly to and below the first opening 122. The arrangement of the first and second openings 122, 124 may vary such that each of the bottom portion 132 and first side portion 126 may have openings in different arrangements depending on the configuration of the rail 120 and/or mounting configuration, e.g., using support 340 and/or flanged support 360 in a solar PV array 108. In the embodiment shown, the second opening 124 is arranged perpendicularly to and below the first opening 122.

Each of the first and second openings 122, 124 comprise a sloped surface 137 located in the second channel portion 144 at an edge of the wall. For example, the first opening 122 has a sloped surface 137 formed at an edge of the second side portion 128 and the second opening 124 has a sloped surface 137 formed at the edge of the bottom portion 132. The sloped surface 137 is sloped in such a way as to urge the flange 168 and hook flange 172 of the channel nut 160 to engage the anchor latch 133 and tooth 125 of the rail, respectively, by the force of the biasing member 180. In operation, once the channel nut 160 is inserted into the first and/or second openings 122, 124, the biasing member 180 engages the sloped surface 137 to oppose and/or retard traversal of the channel nut 160 out of the first and/or second openings 122,124. It is preferable that the channel nut 160 may be released and removed with suitable force by the user.

Referring to FIGS. 2-5, and 11-13, the channel nut 160 comprises a body 161 having ends 162, shown as 162a and 162b, front portion 163, rear portion 164, a top portion 165, and a bottom portion 166. The channel nut 160 is a multi-surface extrusion having structural elements that can be manufactured using metal and/or metal alloy extrusion manufacturing to form longitudinal lengths that are cut to suitable dimensions for the body 161. An opening 167 may be machined therein adapted to receive the fastener 201 of a clamp assembly 200, the opening 167 extending between the top portion 165 and bottom portion 166. The front portion 163 of the body 161 further has a flange 168 formed between the top portion 165 and the front portion 163 configured to operably connect with the tooth 125 of the rail 120. The front portion 163 may also have an angled surface 169 formed between the front portion 163 and the bottom portion 166 so as to interface with the shelf 127 of the rail 120.

Figure 11:
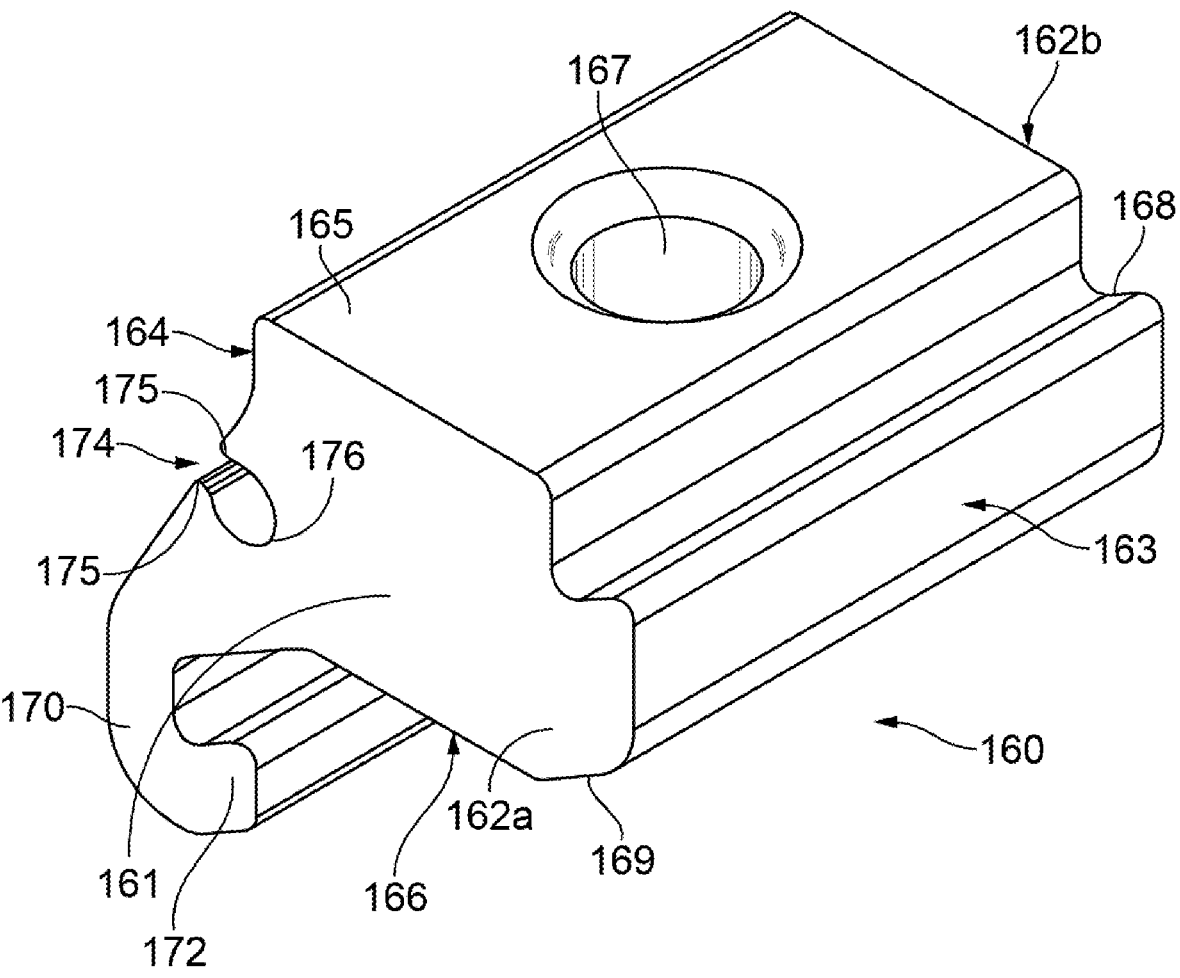
FIG. 11 illustrates a perspective view of the channel nut according to an embodiment of the invention.
Figure 12:
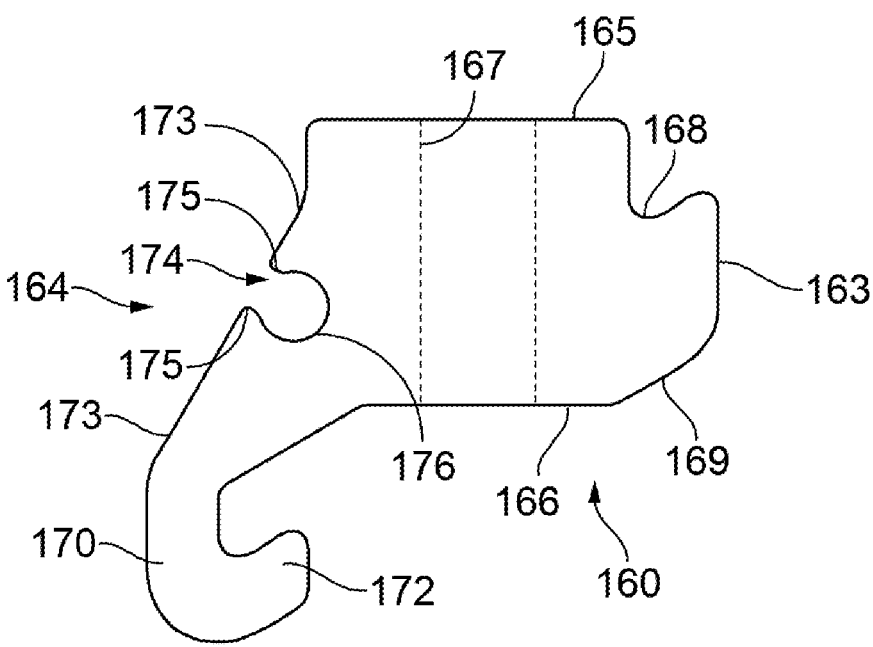
FIG. 12 illustrates a side view of the channel nut of the invention thereof.
Figure 13:
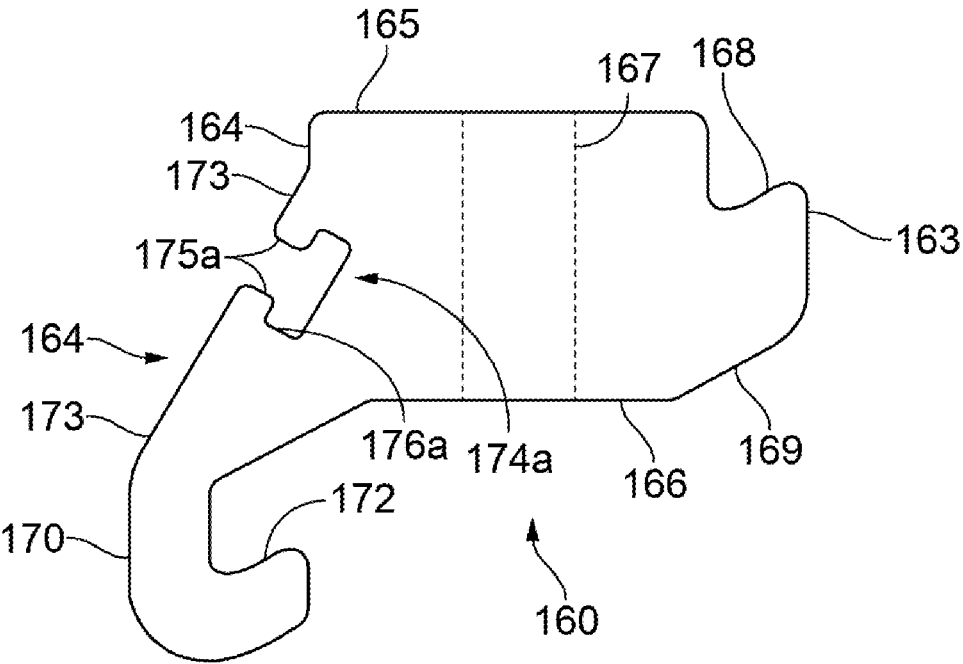
FIG. 13 illustrates a side view of the channel nut according to another embodiment of the invention.

As illustrated in FIGS. 11-13, the rear portion 164 may be configured with an extension 170 extending from the rear portion 164 and bottom portion 166, the extension 170 having a hook flange 172 at the end thereof for interfacing with the anchor latch 133. The rear portion 164 may have a beveled portion 173 having a receiver slot 174 formed therein. The receiver slot 174 may comprise an inlet 175 configured to receive a stem segment 185 and a channel 176 of a dimension larger than the inlet 175 configured to receive a channel portion 186 of the bias element 180 therein, as shown in FIGS. 4-5, 11-13, as well as in FIGS. 14A-14B. The bias element 180 Is configured to use the beveled portion 173 cooperating with the insertion of the channel nut 160 configured to engage surfaces of the rail 120 when the channel nut 160 is inserted such that the bias element 180 forces the channel nut 160 onto the anchor latch 133 and tooth 125 for engagement thereon.

FIGS. 4, 12, and 14A-14B disclose a biasing element 180 according to an embodiment of the invention. The bias element 180 may be secured, affixed and/or formed integral with the channel nut 160. The biasing element 180 may be formed from sheet metal, spring steel or other suitable materials of sufficient flexibility and strength to 1) elastically deform during the initial insertion of the channel nut 160 into a channel opening 122, 124 and 2) move the channel nut 160 into a locked position upon full insertion. The biasing element 180 permits the channel nut 160 to be positioned and secured at a desired location along the length of the rail 120, or structures incorporating the features 125, 133 of the rail 120, thereby enabling the use of the retention system 100 in other applications requiring attaching panels and items such as, for example, aircraft, vehicles and other industrial applications.

Figure 14A:
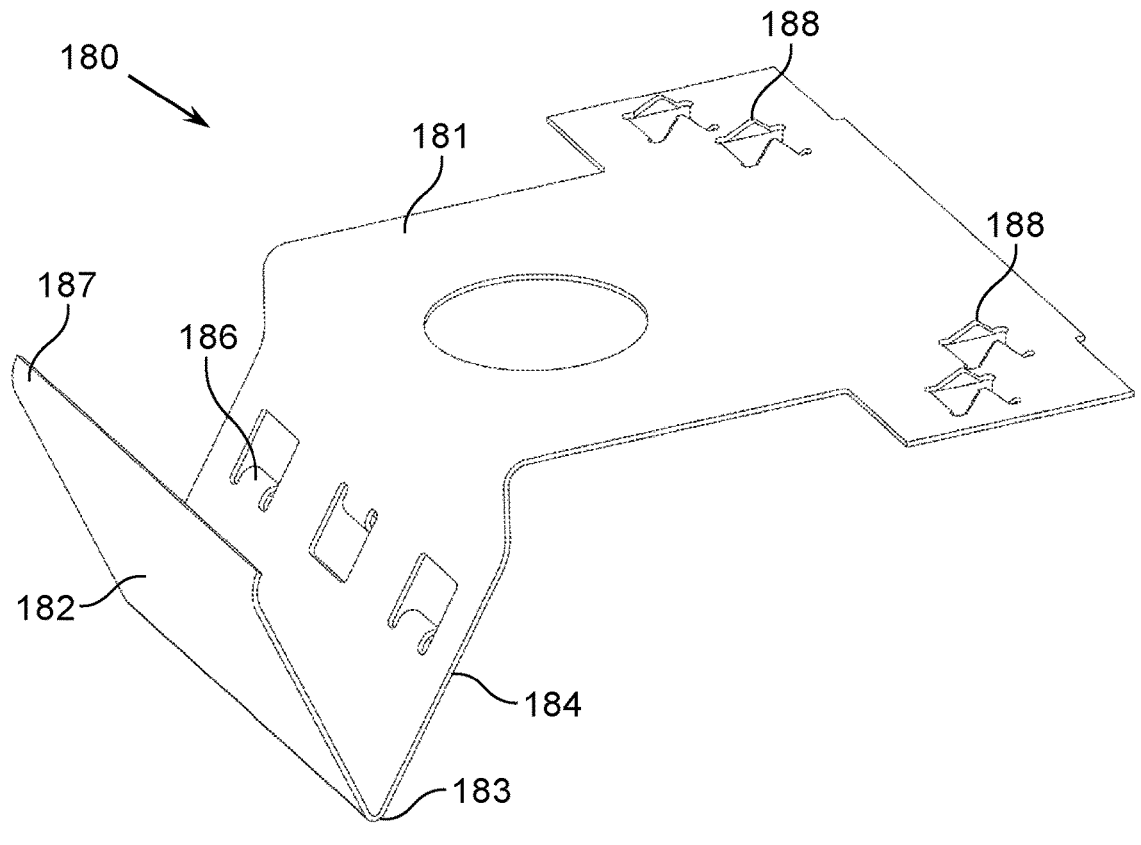
FIG. 14A illustrates a perspective view of a biasing element according to an embodiment of the invention.
Figure 14B:
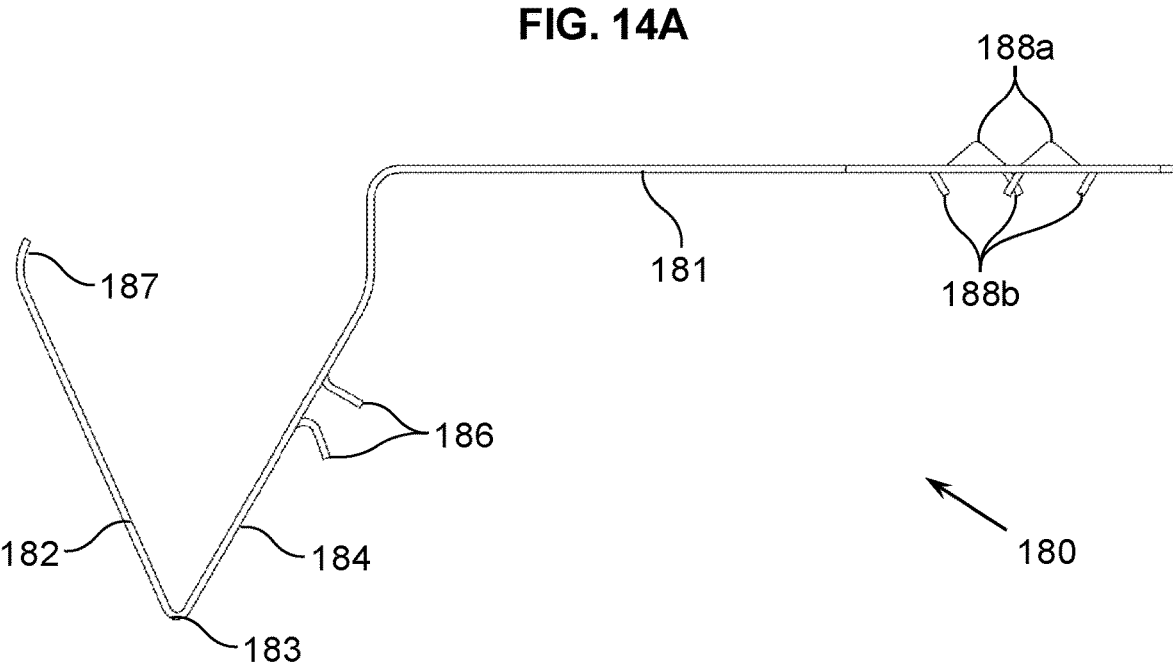
FIG. 14B illustrates a side view of the biasing element thereof.

As illustrated in FIGS. 5, 14A-14B, 20A-20F, and 21, the biasing element 180 may comprise a body 181, a lever arm 182 extending outwardly from a resistance arm 184, and a fulcrum 183 being disposed between said lever arm 182 and said resistance arm 184. In a preferred embodiment, biasing element 180 may be a low-cost-to-manufacture apparatus. For example, in one embodiment as shown in FIGS. 14A and 14B, the biasing element may be made of a formed and cut, and/or a stamped sheet of metal, such as spring steel, or other suitable material having the desired qualities of elastic deformation and rigidity for the purpose of, e.g., anchoring the channel nut 160 during installation. One or more openings 181*a* may be formed within the body 181, as shown in FIG. 14A, wherein each opening 181*a* is configured to receive a respective clamp assembly 200. The body 181 may further comprise grounding spikes 188 that protrude above and/or below the plane formed by the body 181. The grounding spikes 188*b* on the underside of the body 181 may dig into, and electrically connect to, the rail 120, while the grounding spikes 188*a* on the upper side of the body 181 may dig into, and electrically connect to, a clamp assembly

Figure 16:
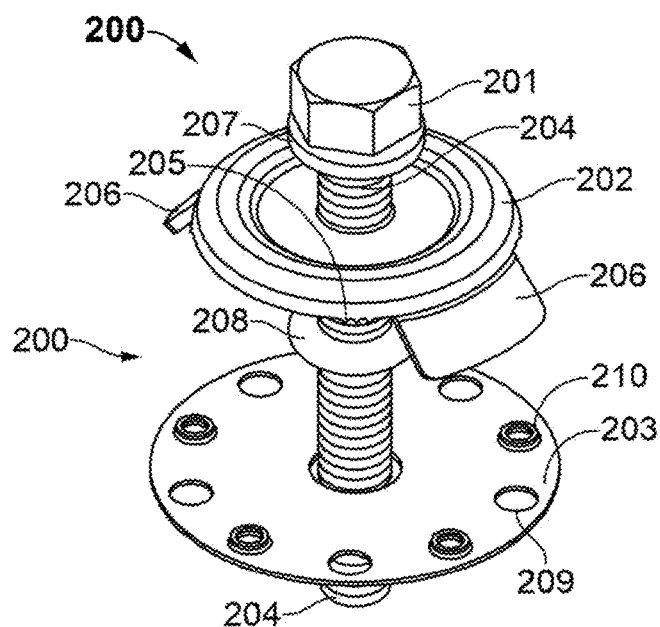
FIG. 16 illustrates a perspective view of the clamp assembly.

200, such as, for example, via the grounding washer 203 as shown in, e.g., FIGS. 2, 3, and 16. The grounding circuit may then be configured through each other component of the system, and then down and away from the location, such as in the application of a roof installation.

The resistance arm 184 may further comprise one or more channel tabs 186 configured to be received in the inlet 175 and/or channel 176 of the channel nut 160. The channel tabs 186 may be formed in any suitable shape and dimension, such as, for example, formed of one or more discrete folded portions 186 extending away from the resistance arm 184 as shown in FIGS. 14A and 14B. Alternatively, channel tabs may be formed having a semi-cylindrical or T-shaped cross-section, which may compliment the shape of the channel 176 to thereby allow insertion therein. In any of these embodiments, once assembled, the channel tab(s) 186 may affix the resistance arm 184 and fulcrum 183 to the beveled portion 173 of the channel nut 160. The lever arm 182 may further comprise an arcuate end segment 187 which, upon substantial insertion of the channel nut 160, may mate with the sloped surface 137 of the channel opening 122, 124.

The biasing element 180 is configured to elastically deform when the channel nut 160 is inserted into an opening 122, 124 of the rail 120. As the channel nut 160 is inserted further, the resistance arm 184, fulcrum 183, lever arm 182, and end segment 187 remain flexed, i.e., compressed, while the channel nut features 169, 172 engage with the channel features 125, 133 and translate the channel nut 160 toward the first channel portion 142. As the channel nut 160 reaches the bottom of the channel the lever arm 182 presses against sloped surface 137 on the interior of the rail 120 causing the biasing element 180 to move the channel nut flange 168 and hook 172 under the tooth 125 and anchor latch 133, respectively.

Figure 15:
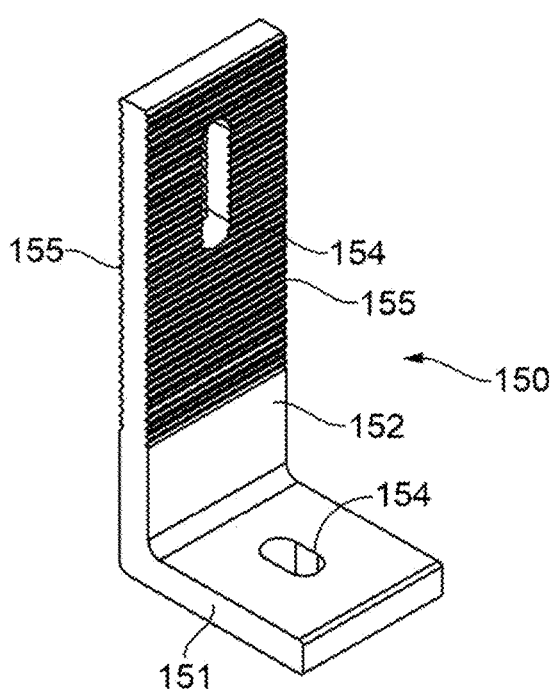
FIG. 15 illustrates a perspective view of the L-bracket of the invention.

Referring to FIG. 15, a bracket 150 may be used for operably connecting the retention system 100 to the structure 101 via support 340, stand support 350, and/or support flange 360. The bracket 150 provides elevation above the surface 102 at a predetermined distance as desired and a grounding connectivity to the structure 101. The bracket 150 comprises a base 151 and an extension 152 with a groove portion 155 on one or more sides of the extension 152 for height adjustment of adjacent PV modules 107 in a PV array 108. For example, the bracket 150 of the retention system 100 can be an angle or corner bracket, for example, an L-shaped bracket having a base segment 151 and an extension segment 152 formed with one or more grooves or irregularities 155 on one or more side surfaces for operably connecting the L-bracket 150 to the structure 101 and/or rail 120. The groove portion 155 can further provide an operable grounding connection to the rail 120 and/or the fastener 201. An opening 154 may be formed in the base 151 and/or the extension 152 to provide an opening for a fastener 201, for example, to fasten the base 151 to the support 340, stand support 350, and/or support flange 360 or to fasten the connector 112 to the rail 120 using a fastener 114 and the channel nut 160. The opening 154 may further be formed as a slot so as to allow the fastener, e.g., 201, to move within the opening 154 to provide adjustments to solar panels 107 in the PV array 108, for example, in the x, y and/or z-axis for horizontal and vertical adjustments.

Figure 17A:
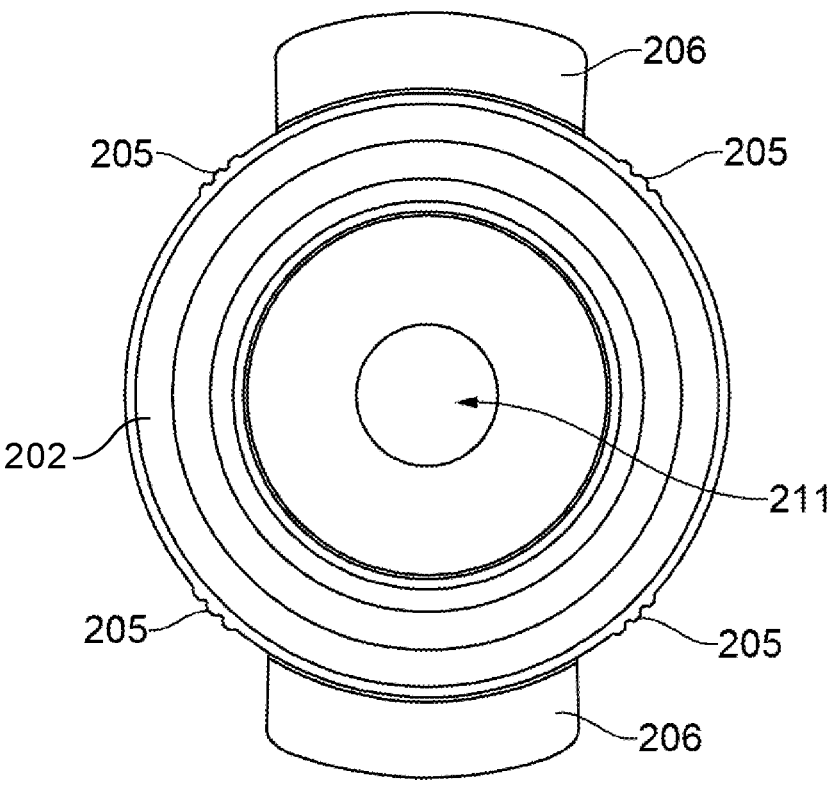
FIGS. 17A and 17B illustrate top and side views, respectively, of the top spacer of the clamp assembly of the invention.
Figure 17B:
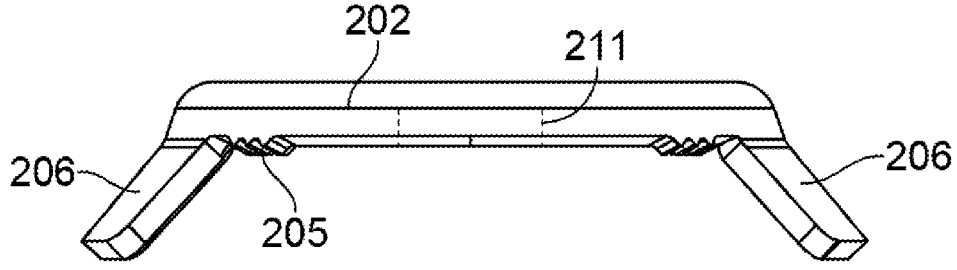

Referring to FIGS. 1-3, 6A-6C, 7, 16, 17A-17B, and 21, the clamp assembly 200 comprises a fastener 201, washer 202, and grounding washer 203. The fastener 201 may be of a suitable dimension and strength to clamp and hold the panel 107 or other item, for example, a screw, self-tapping screw, or bolt 201 with a threaded portion 204 for operably connecting with the opening 167 of the channel nut 160. Any such fastener 201 is configured to secure the respective rail 120 and channel nut 160. The washer 202 has an opening 211 so as to receive the fastener 201 therethrough as shown in FIGS. 16 and 17A-17B. The washer 202 comprises protrusions or teeth 205 located on a lower edge thereof for forming an operable grounding connection with a panel 107, and one or more tabs 206 for providing spacing between panels 107. The clamp assembly 200 may additionally comprise a washer 207 disposed between the head of the bolt 201 and the washer 202, and a rubber washer 208 disposed between the washer 202 and the grounding washer 203. The grounding washer 203 further comprises protrusions 209, 210 projecting from the bottom and top surfaces thereof for forming an operable grounding connection with a panel 107. The bottom protrusions 209 form a ground connection with the biasing element 180 and/or the rail 120, while the top protrusions 210 form a ground connection with a panel frame 107.

Figure 18A:
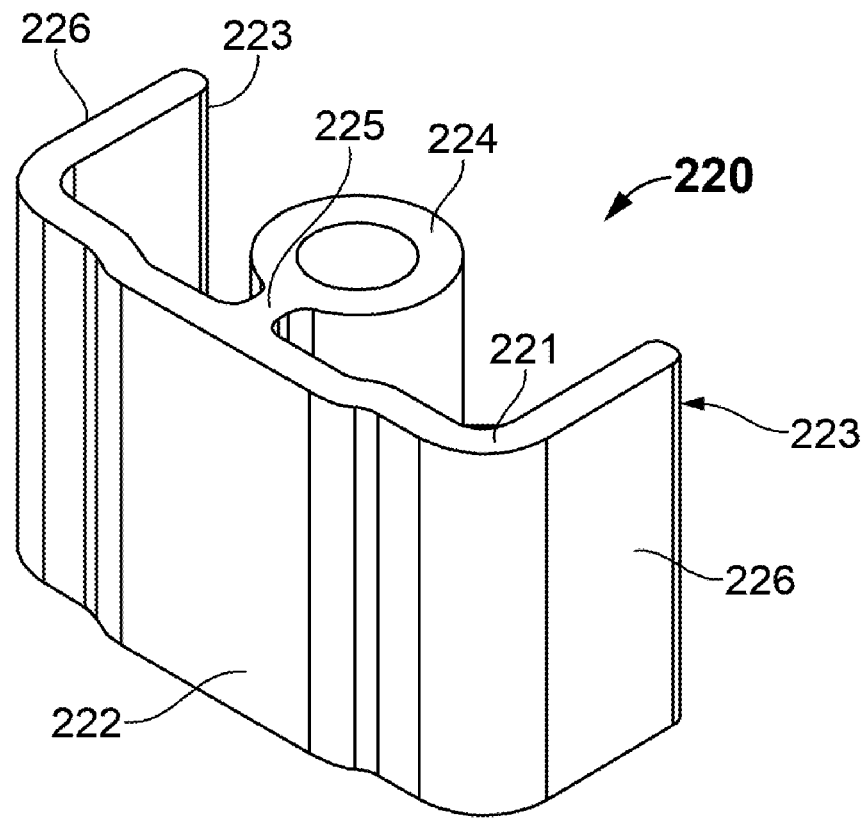
FIGS. 18A and 18B illustrate perspective and top views, respectively, of an end support of the invention.
Figure 18B:
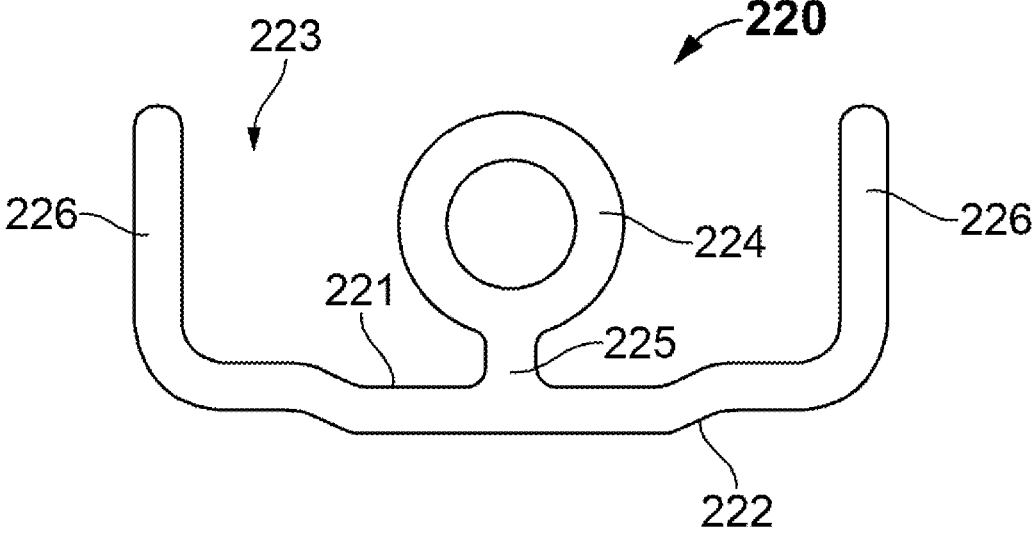

Referring to FIG. 18A-18B, a spacer 220 may also be provided with the retention system 100 for use between the clamp assembly 200 and clamping nut 160 in securing a respective panel 107 at an end of a PV array 108. The spacer 220 comprises a body 221 having a front portion 222, rear portion 223, a guide portion 224 attached by a connection 225 to the rear portion 223, and one or more side portions 226 configured for engaging a top portion 130 of the rail 120. The spacer 220 is a multi-surface extrusion having structural elements that can be manufactured using metal and/or metal alloy extrusion manufacturing to form longitudinal lengths that are cut to suitable dimensions, e.g., the spacer has a dimension corresponding to a frame dimension of the panel 107 for securing the clamp assembly 200 thereto. The guide portion 224 is configured to receive the fastener 201 therethrough so as to allow the threaded portion 204 to operably connect to the opening 167 in the channel nut 160, as shown in FIG. 3.

Figures 19A, 19B:
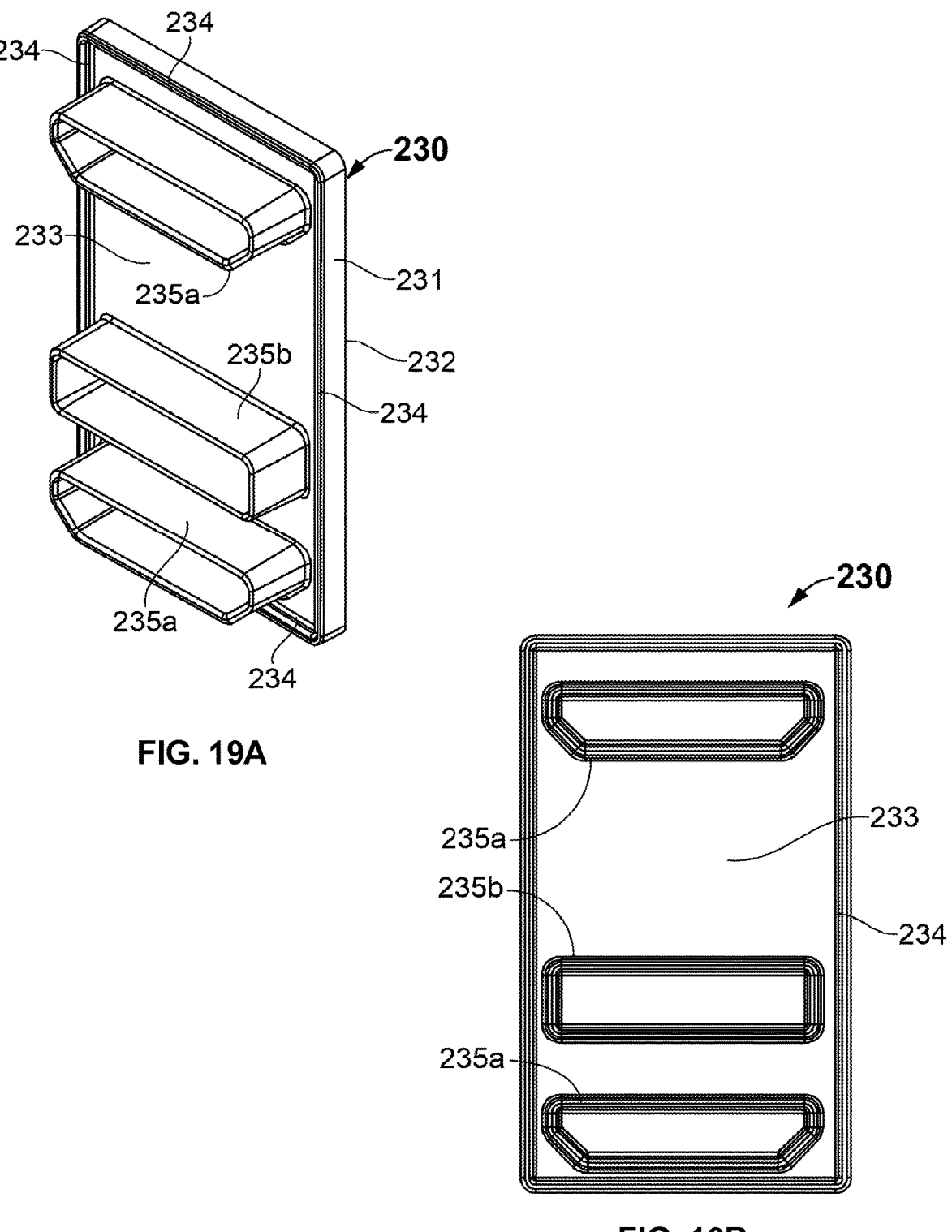
FIGS. 19A and 19B illustrate perspective back view and back view, respectively, of an end cap of the invention.

Referring to FIG. 19A-19B, an end cap 230 may also be provided for use to close open ends of the rail 120, as desired, in the retention system 100. The end cap 230 comprises a body 231 having a front portion 232, a rear portion 233, edge portion 234, and one or more connector portions 235 extending from the rear portion 233. The front portion 232 may be configured as smooth or with textures for a decorative appearance. The rear portion 233 is configured to operably connect to the end of the rail 120 using the one or more connector portions 235. The connector portions 235 can be configured in a variety of shapes so as to conform to a corresponding dimension of the rail, for example, designated shapes of channel connector portions 235a and 235b. Moreover, the edge portion 234 on the end cap 230 is configured to operably connect the perimeter of the rail 120 so as to close the end from dirt and other environmental contaminants.

Figures 20A, 20B, 20C:
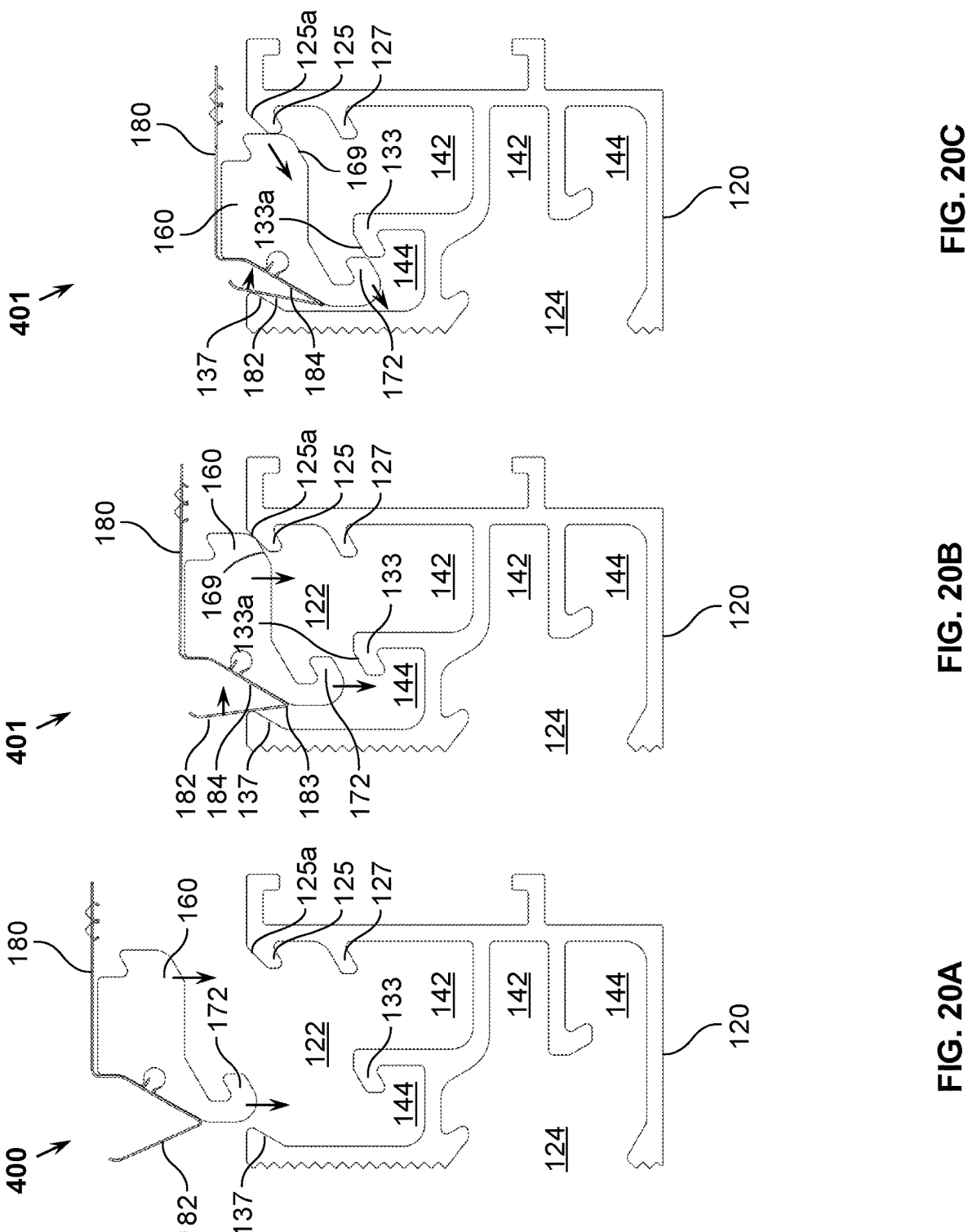
FIGS. 20A through 20F illustrate the operation of the rail and channel nut apparatus, system and method according to an embodiment of the invention.

The operation of the rail and channel nut apparatus, system and steps of the method 100, according to embodiments of the present invention, is illustrated in FIGS. 20A through 20F, and 21. As illustrated in FIG. 20A, in a step 400, the channel nut 160 and biasing element 180 are positioned for entry into the first opening 122 in the top portion 130 of the rail 120. Similarly, the channel nut 160 and biasing element 180 may also be positioned for entry into the second opening 124 in the first side portion 126 of the rail 120.

Figures 20D, 20E, 20F:
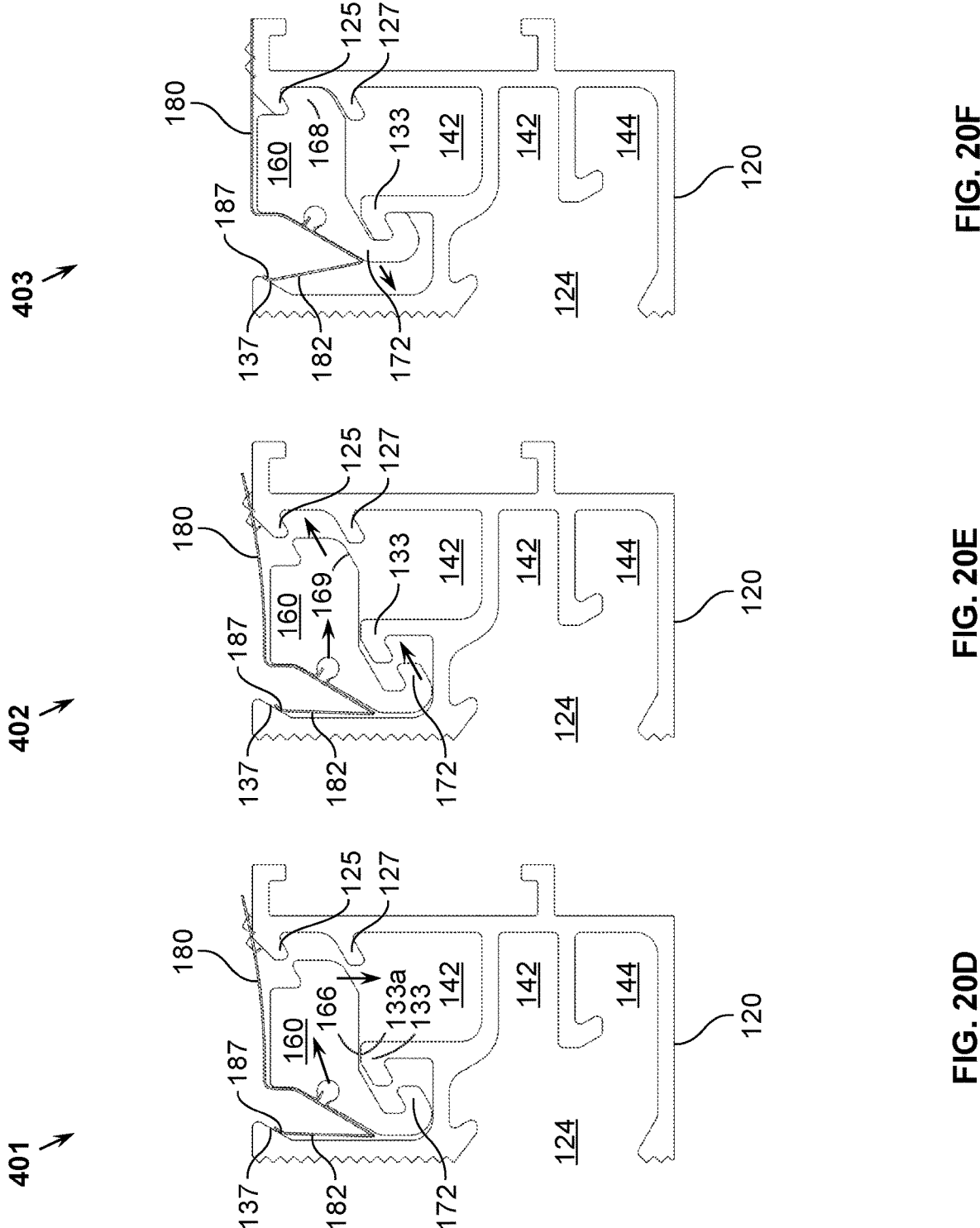

Insertion of the channel nut is illustrated in FIGS. 20B-20D, in a step 401. As illustrated in FIG. 20B, in a step 401, a downward vertical force applied to the channel nut 160 starts entry into the first opening 122, thereby compressing the biasing element 180. The applied force also causes the angled surface 169 of the channel nut 160 to slidably move along the sloped upper surface 125a of the tooth 125, thereby moving the channel nut 160 into the second channel portion 144. As illustrated in FIG. 20C, in step 401, continued applied force of the channel nut 160 causes the angled surface 169 to clear the sloped surface 125a of the tooth 125 and to enter the first channel portion 142. Also, continued applied force on the channel nut 160 provides further compressing of the lever arm 182 against the resistance arm 184 storing energy in biasing element 180 as the channel nut 160 continues entry in the second channel portion 144. As illustrated in FIG. 20D, in step 401, force is applied until the bottom portion 166 of the channel nut 160 is stopped by the upper surface 133a of the anchor latch 133.

As illustrated in FIG. 20E, in a Step 402, the applied force is stopped so that the stored energy in the biasing element 180 causes the angled surface 169 to move towards the shelf 127, thereby engaging a portion of the angled surface 169 with the shelf 127. It will be appreciated by one having skill in the art that the hook flange 172 is unrestrained in the second channel portion 144, and because of the stored energy in the biasing element 180, the hook flange 172 also moves towards the anchor latch 133, thereby engaging a portion of the hook flange 172 with the anchor latch 133.

As illustrated in FIG. 20F, in a Step 403, the applied force is completely removed. The channel nut 120 moves the angled surface 169 into the space between tooth 125 and the shelf 127 using the stored energy of the biasing element 180, thereby securing the channel nut flange 168 therebetween. Similarly, channel nut 120 moves the hook flange 172 into an operable connection with the anchor latch 133 using the stored energy of the biasing element 180, thereby securing the hook flange 172 to the anchor latch 133. The end segment 187 further engages the sloped surface 137, and it is appreciated that the end segment may be formed in a variety of shapes, e.g., arcuate, round, smooth or other shape, sufficient to slidingly engage the sloped surface 137 upon entry and/or to set the direction of the forces of the biasing element 180 to move the channel nut 160 into engagement in the first and second openings 122, 124 of the rail 120. Thereafter, the channel nut 160 is held by the force of the biasing element 180 in the position in which it was inserted into the first opening 122 in the rail 120. The channel nut 160 resists extraction from the rail 120, but may be removed by overcoming the forces applied by the biasing element 180.

Figure 21:
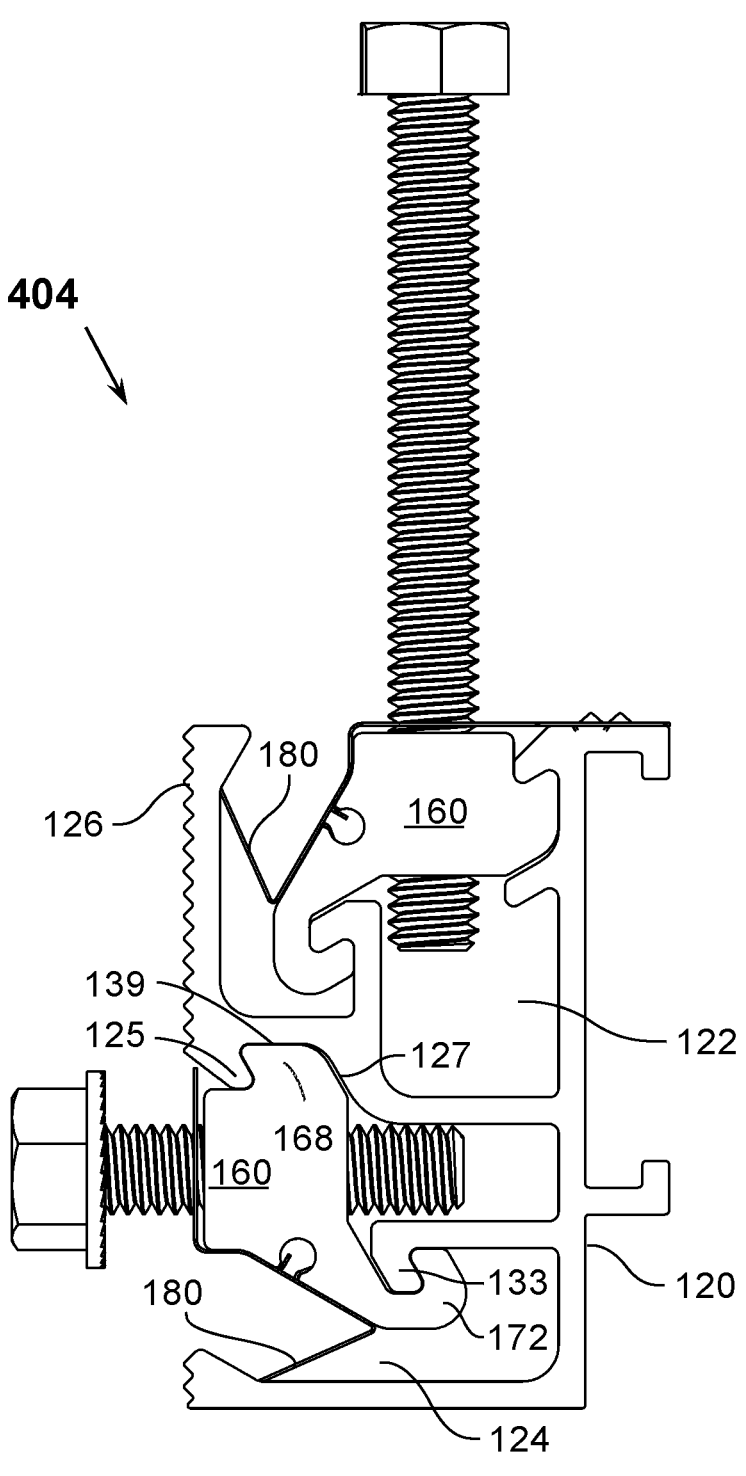
FIG. 21 illustrates a side view of the channel nut engaged in both channels of the rail and system.

As shown in FIG. 21, in a Step 404, the clamp assembly 200 may be coupled to the channel nut 160 so that, in conjunction with the environmental component to be held (not shown) and upon applying sufficient tightening to the assembly 200, a counter-active force urges the channel nut against the against the rail 200, thereby locking the system in an affixed position. The process of steps 400-403 can be repeated so as to position and insert another channel nut 160 into the second opening 124 opening in the first side portion 126 of the rail 120. Similarly, the channel nut 160 may be secured in the second opening 124 the hook flange 173 into an operable connection with the anchor latch 133 and the channel nut flange 168 positioned in the space between the tooth 125 and the shelf 127, i.e., recess 139.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A retention system for securing one or more devices to a structure, the retention system comprising:

a rail characterized by a longitudinal length including a cross-sectional profile including a first opening and a second opening, each opening disposed orthogonally with respect to the other, each opening including a first channel portion having a recess formed between a tooth and a shelf and a second channel portion having an anchor latch and a sloped surface;

one or more channel nuts, each channel nut including:

a channel nut body, a flange and a hook flange, each extending outwardly from said channel nut body, each channel nut of said one or more channel nuts being configured to be received within either of said first and second openings, wherein said hook flange is of a dimension to receive said anchor latch of either of said first or second openings of said rail and/or said flange is of a dimension to be received within said recess formed between said tooth and said shelf, to thereby provide a counter-balanced, rigid attachment to said rail when said one or more channel nuts is in an assembled configuration with said rail, a receiver slot formed within said channel nut body, said receiver slot including an inlet, and an attachment opening for securing the one or more devices thereto, said attachment opening formed within said channel nut body;

a biasing element configured to operably couple to a respective one of each channel nut of said one or more channel nuts, each biasing element including:

a biasing element body, a resistance arm extending outwardly from said biasing element body, said resistance arm having one or more channel tabs configured to be received in said inlet and/or said receiver slot of said channel nut, a lever arm extending outwardly from said resistance arm; and a fulcrum formed between said resistance arm and said lever arm, said lever arm configured to deflect, with respect to said resistance arm, upon application of a force; and wherein said biasing element further comprises a conductive metal and one or more grounding spikes formed in said biasing element body and configured for electrical grounding of the one or more devices to said retention system;

a side portion configured to attach said rail to a bracket;

wherein, during installation said biasing element is configured to hold the one or more channel nuts in the correct position and orientation with respect to said rail, while said one or more devices are moved into position and subsequently coupled to said attachment opening of said one or more channel nuts.

2. The retention system of claim 1 further comprising said bracket coupled to said side portion, said bracket configured to couple said rail to said structure.

* * * * *